US011031777B2

(12) United States Patent
Joo et al.

(10) Patent No.: US 11,031,777 B2
(45) Date of Patent: Jun. 8, 2021

(54) CLAMPING OPERATION AND APPARATUS FOR SURGE PROTECTION

(71) Applicant: SAMSUNG ELECTRONICS CO., LTD., Suwon-si (KR)

(72) Inventors: Sungyong Joo, Suwon-si (KR); Sunjin Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 74 days.

(21) Appl. No.: 16/421,987

(22) Filed: May 24, 2019

(65) Prior Publication Data
US 2019/0393698 A1    Dec. 26, 2019

(30) Foreign Application Priority Data

Jun. 21, 2018  (KR) .................. 10-2018-0071655

(51) Int. Cl.
*H02H 9/04* (2006.01)
*H02H 1/00* (2006.01)
(Continued)

(52) U.S. Cl.
CPC ............ *H02H 9/04* (2013.01); *H02H 1/0007* (2013.01); *H02H 9/042* (2013.01); *H02H 9/08* (2013.01); *H05B 45/37* (2020.01)

(58) Field of Classification Search
CPC .......... H02H 9/04; H02H 9/041; H02H 9/042; H02H 9/08; H02H 1/0007; H05B 45/37
See application file for complete search history.

(56) References Cited

U.S. PATENT DOCUMENTS 6,226,162 B1 * 5/2001 Kladar ................... H02H 9/041
                                                         361/111
7,529,073 B2    5/2009 Cern
(Continued)

FOREIGN PATENT DOCUMENTS

EP    2874261 A2    5/2015
JP    4626809 B2    2/2011
(Continued)

OTHER PUBLICATIONS

Written Opinion (PCT/ISA/237) issued by the International Searching Authority in corresponding International Application No. PCT/KR2019/006494, dated Sep. 19, 2019.
(Continued)

*Primary Examiner* — Kyle J Moody
*Assistant Examiner* — Jye-June Lee
(74) *Attorney, Agent, or Firm* — Sughrue Mion, PLLC

(57) ABSTRACT

An electronic apparatus is provided. The electronic apparatus according to an embodiment includes a main circuit unit, a power source supplier configured to generate power, and supply the generated power to the main circuit unit, and a surge protector disposed between the main circuit unit and the power source supplier, the surge protector being configured to, based on a surge occurring from the power source supplier, perform a clamping operation on power output from the power source supplier at a first voltage level, wherein the power source supplier is further configured to, based on the clamping operation of the surge protector at the first voltage level being stopped, perform a clamping operation on the generated power at a second voltage level greater than the first voltage level.

18 Claims, 16 Drawing Sheets

(51) Int. Cl.
*H05B 45/37* (2020.01)
*H02H 9/08* (2006.01)

(56) References Cited

U.S. PATENT DOCUMENTS

| | | | |
|---|---|---|---|
| 8,625,246 B2 | 1/2014 | Yu et al. | |
| 8,717,726 B2 | 5/2014 | de Palma et al. | |
| 9,859,049 B2 | 1/2018 | Lestician | |
| 2002/0071233 A1 | 6/2002 | Bock et al. | |
| 2003/0174453 A1 | 9/2003 | Hsu et al. | |
| 2006/0050465 A1 | 3/2006 | Cho et al. | |
| 2006/0262478 A1 | 11/2006 | Chaudhry | |
| 2008/0123239 A1 | 5/2008 | Wilson | |
| 2009/0154044 A1 | 6/2009 | Crevenat et al. | |
| 2011/0299203 A1* | 12/2011 | Ruess | H02H 9/042 361/56 |
| 2012/0218670 A1 | 8/2012 | Han | |
| 2012/0250205 A1* | 10/2012 | Pfitzer | H02H 9/041 361/91.1 |
| 2014/0055895 A1 | 2/2014 | Divan | |
| 2014/0254057 A1* | 9/2014 | Chen | H02H 9/08 361/118 |
| 2015/0303678 A1 | 10/2015 | Wang et al. | |
| 2016/0050724 A1* | 2/2016 | Moon | H05B 45/37 315/200 R |
| 2016/0087431 A1* | 3/2016 | Krumpholz | H02H 9/041 361/56 |
| 2017/0127486 A1* | 5/2017 | Kang | H05B 45/37 |
| 2018/0006452 A1 | 1/2018 | Moore et al. | |

FOREIGN PATENT DOCUMENTS

| | | |
|---|---|---|
| JP | 5611488 B2 | 10/2014 |
| KR | 10-0388361 B1 | 6/2003 |
| KR | 10-0655229 B1 | 12/2006 |
| KR | 10-0657872 B1 | 12/2006 |
| KR | 10-1275415 B1 | 6/2013 |
| KR | 10-1563278 B1 | 10/2015 |
| WO | 2011139204 A1 | 11/2011 |
| WO | 2015098688 A1 | 7/2015 |

OTHER PUBLICATIONS

International Search Report (PCT/ISA/210), issued by International Searching Authority in corresponding International Application No. PCT/KR2019/006494, dated Sep. 19, 2019.
Communication dated Feb. 2, 2021 issued by the European Patent Office in application No. 19822719.1.

* cited by examiner

-- Related Art --

FIG. 4

| Model no. | Varistor Voltage 1mA(V) | | | Max. Continuous Voltage(V) | | Max. Clamping Voltage(V) | | Power dissipation | Energy (10/1000μs) | Peak Current (8/20μs) | |
|---|---|---|---|---|---|---|---|---|---|---|---|
| | Min | VN(DC) | Max | Vm(ac) | Vm(dc) | Vc(V) | Ip(A) | Ptam(W) | Wtm(J) | Itm(A) | |
| INR14D391K | 351 | 390 | 429 | 250 | 320 | 650 | 50 | 0.6 | 70 | 4,500 | ~410 |
| INR14D431K | 387 | 430 | 473 | 275 | 350 | 710 | 50 | 0.6 | 75 | 4,500 | |
| INR14D471K | 423 | 470 | 517 | 300 | 385 | 775 | 50 | 0.6 | 80 | 4,500 | |
| INR14D561K | 504 | 560 | 616 | 350 | 455 | 925 | 50 | 0.6 | 80 | 4,500 | |
| INR14D621K | 558 | 620 | 682 | 385 | 505 | 1,025 | 50 | 0.6 | 85 | 4,500 | |
| INR14D681K | 612 | 680 | 748 | 420 | 560 | 1,120 | 50 | 0.6 | 90 | 4,500 | |
| INR14D751K | 675 | 750 | 825 | 460 | 615 | 1,240 | 50 | 0.6 | 100 | 4,500 | ~420 |

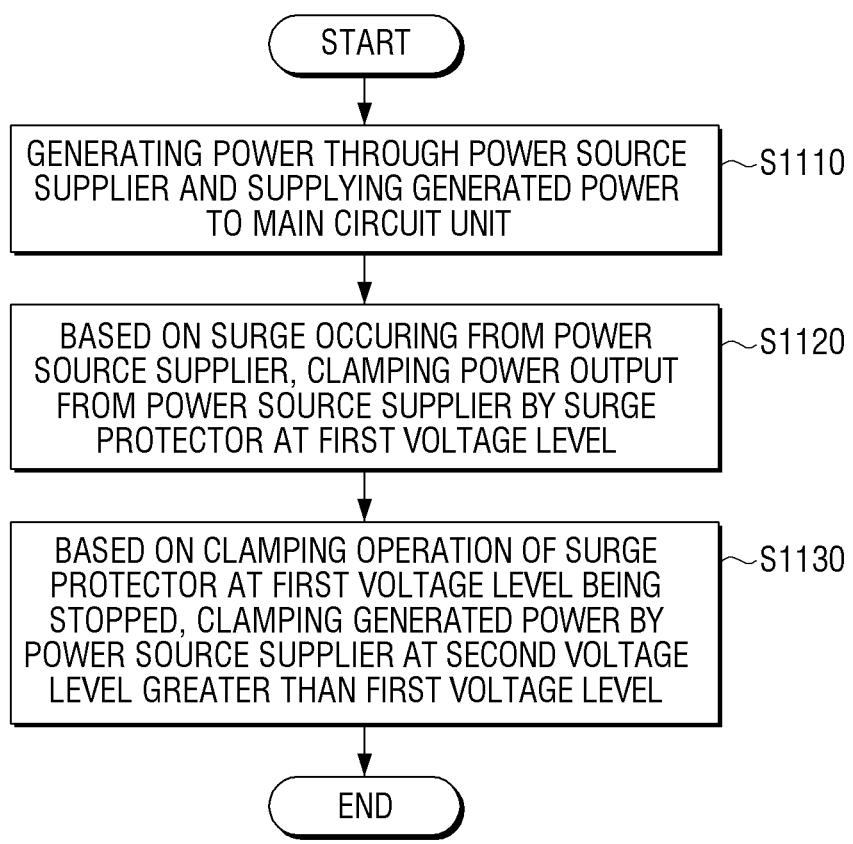

CLAMPING OPERATION AND APPARATUS FOR SURGE PROTECTION

CROSS-REFERENCE TO RELATED APPLICATIONS

This application claims priority from Korean Patent Application No. 10-2018-0071655, filed on Jun. 21, 2018, in the Korean Intellectual Property Office, the disclosure of which is incorporated herein by reference in its entirety.

BACKGROUND

1. Field of the Invention

Devices and methods consistent with what is disclosed herein relate to an electronic apparatus and a controlling method thereof, and more particularly, to an electronic apparatus capable of protecting a circuit from an overvoltage and a controlling method thereof.

2. Description of the Related Art

With the development of electronic technology, various types of electronic apparatuses have been developed and widely used. Particularly, a display apparatus used in a variety places such as home, office, and public place have been developed for years.

When lightning, or the like occurs, a surge occurs, and the surge can be delivered along a wire or an electric circuit. The surge is a transient waveform of an electrical current, voltage or power with the characteristics of a rapid increase and a gradual decrease over a short period of time, which can adversely affect electronic apparatuses. Thus, generally, a surge includes a voltage surge.

For example, when a sudden overvoltage occurs in a power line due to lightning, or the like, it may cause dielectric breakdown or failure of an electronic apparatus. Accordingly, the electronic apparatus may be provided with a surge protection circuit to limit the effect of such surge.

FIG. 1 is a view illustrating a surge protection circuit according to a conventional technique.

In most cases of a conventional surge protection circuit, an AC power input is connected in parallel from Live to Neutral, but due to a response characteristic and that a leakage current flows largely at the time of component deterioration, damage accompanied by ignition may occur largely. That is, a leakage current may be generated by a varistor included in the surge protection circuit, thereby to damage the circuit.

A varistor connected to a power source in parallel is a device having a large difference between a normal operating voltage (Continuous Voltage) and a peak current (Max Continuous). Thus, the varistor operates at a high voltage when a lightning-fast surge occurs, and the surge-based damage could be applied to a circuit behind the varistor.

In addition, there also arises a problem that a leakage current increases by using a varistor having a relatively low normal operating voltage.

Accordingly, there is a need for a method capable of minimizing damage to a circuit due to a surge while preventing a leakage current from increasing.

SUMMARY

An electronic apparatus, including: a main circuit unit; a power source supplier configured to generate power, and supply the generated power to the main circuit unit; and a surge protector disposed between the main circuit unit and the power source supplier, the surge protector being configured to, based on a surge occurring within the power source supplier, perform a first clamping operation on a power output from the power source supplier at a first voltage level or lower, wherein the power source supplier is further configured to, based on the first clamping operation being stopped, perform a second clamping operation within the power source supplier at a second voltage level greater than the first voltage level.

In some embodiments, the electronic apparatus includes an overvoltage protection circuit unit coupled to the main circuit unit, wherein the overvoltage protection circuit unit includes a capacitor, and wherein the overvoltage protection circuit unit is configured to, based on an output voltage level of the main circuit unit charging the capacitor to a value equal to or greater than a third voltage level, stop the first clamping operation.

In some embodiments, the surge protector includes: a first varistor of which a first end is connected to an output terminal of the power source supplier; a Silicon Controlled Rectifier (SCR) including: an anode terminal connected to a second end of the first varistor, and a cathode terminal connected to a circuit ground; and a surge sensor including: an input terminal connected to the power source supplier, and an output terminal connected to a gate terminal of the SCR.

In some embodiments, the surge sensor is configured to: sense a fourth voltage level of the power source supplier, and based on the fourth voltage level is, due to the occurrence of the surge, being equal to or greater than a fifth voltage level, turn on the SCR by applying a signal to the gate terminal of the SCR, and wherein the surge protector is further configured to, based on the SCR being turned on and a second end of the first varistor being connected to the circuit ground, maintain the output terminal of the power source supplier at the first voltage level or lower by the first varistor.

In some embodiments, the surge sensor is further configured to, based on the fourth voltage level being less than the fifth voltage level, stop applying the signal to the gate terminal of the SCR, thereby turning off the SCR and stopping the first clamping operation.

In some embodiments of the electronic apparatus a first end of the capacitor is connected to an output terminal of the main circuit unit and a second end of the capacitor is connected to a circuit ground, and wherein the overvoltage protection circuit unit further includes: a resistor connected to the capacitor in parallel; and a switching element, wherein a first terminal of the switching element is connected to the output terminal and to the first end of the capacitor, and wherein a second terminal of the switching element is connected to the gate terminal of the SCR, and wherein a third terminal of the switching element is connected to the circuit ground.

In some embodiments of the electronic apparatus the switching element is configured to turn on when the second terminal of the switching element, based on a voltage level of the capacitor being greater than or equal to the third voltage level, and wherein the surge protector is further configured to, based on the switching element being turned on and the SCR being turned off, stop the first clamping operation.

In some embodiments of the electronic apparatus, the power source supplier includes: a power source; and a second varistor connected to the power source in parallel, wherein the second varistor is configured to perform a second clamping operation on an output of the power source at the second voltage level.

In some embodiments of the electronic apparatus the surge sensor is further configured to: sense a voltage level of a predetermined node in the main circuit unit, and apply a signal to the gate terminal of the SCR based on the sensed voltage level.

Also provided is method for controlling an electronic apparatus, wherein the electronic apparatus comprises a main circuit unit, a power source supplier, and a surge protector disposed between the main circuit unit and the power source supplier, the method including: generating, by the power source supplier, power and supplying the generated power to the main circuit unit; by the surge protector and a surge occurs from the power source supplier, a first clamping operation on a power output of the power source supplier at a first voltage level or lower; and based on the first clamping operation being stopped, performing a second clamping operation by the power source supplier within the power source supplier at a second voltage level greater than the first voltage level.

In addition, a surge protection apparatus is provided, including: a varistor coupled to a first input and an output of the surge protection circuit, wherein the first input is configured to be coupled to a power supplier unit and the first output is configured to be coupled to a main circuit unit; a silicon controlled rectifier (SCR) coupled to the varistor, wherein the SCR is configured to be coupled to an overvoltage protection circuit, and wherein the SCR forms a circuit path between the varistor and a circuit ground; and a surge sensor configured to be coupled to the power source supplier via at least a second input, wherein the surge sensor is configured to: perform a clamping action, using the varistor and the SCR, to clamp the first input to a first voltage based on a measured voltage of the power source supplier exceeding a second voltage, and wherein the SCR is configured to, based on a third voltage of the overvoltage protection circuit exceeding a fourth voltage, stop the clamping action by interrupting the circuit path between the varistor and the circuit ground.

BRIEF DESCRIPTION OF THE DRAWINGS

FIG. 4 is a view to explain a varistor according to an embodiment of the disclosure;

FIG. 11 is a flowchart to explain a controlling method of an electronic apparatus according to an embodiment of the disclosure.

DETAILED DESCRIPTION OF EXEMPLARY EMBODIMENTS

Figure 1:
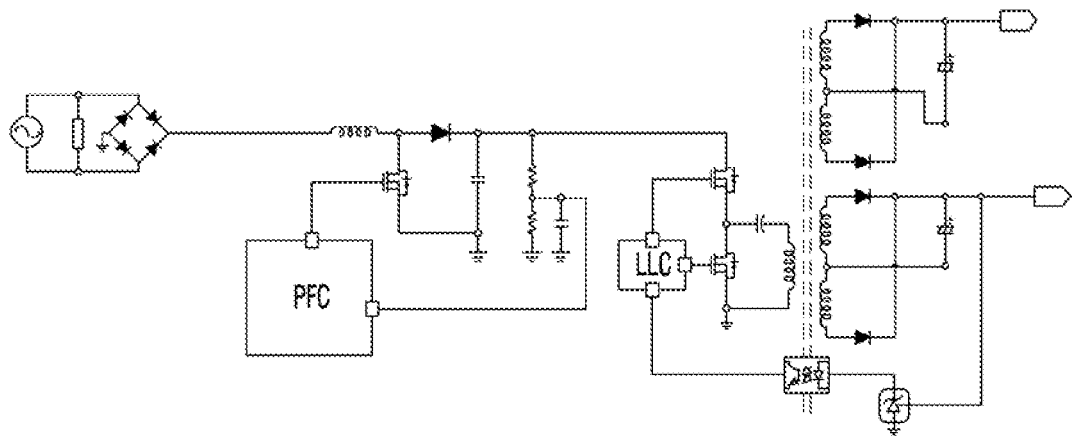
FIG. 1 is a view illustrating a surge protection circuit according to a conventional technique.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, various embodiments of the disclosure will be described in detail with reference to the accompanying drawings.

Figure 2:
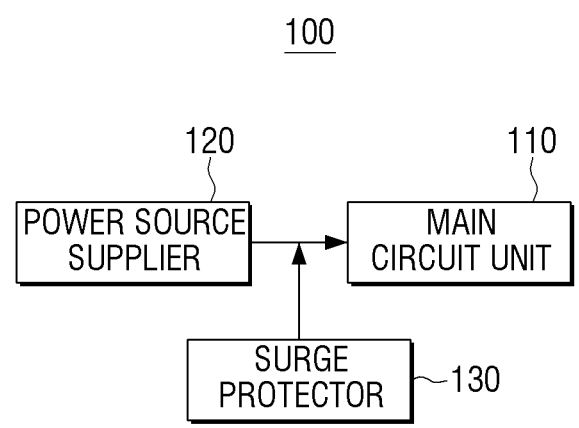
FIG. 2 is a view illustrating an electronic apparatus according to an embodiment of the disclosure.

FIG. 2 is a view illustrating an electronic apparatus 100 according to an embodiment of the disclosure. Referring to FIG. 2, an electronic apparatus 100 may include a main circuit unit 110, a power source supplier 120, and a surge protection unit 130.

The electronic apparatus 100 could be any type as long as it includes a power source supplier. For example, the electronic apparatus 100 may be a set-top box (STB), a server, a BD player, a disk player, a streaming box, a desktop PC, a laptop, a smart phone, a tablet PC, a TV, or the like.

The electronic apparatus 100 may be a part of entire electronic apparatus, which supplies power. For example, the electronic apparatus 100 may be a display apparatus excluding a display, etc. for supplying power to the display apparatus.

The electronic apparatus 100 may be an apparatus that supplies power to a plurality of other electronic apparatuses. For example, the plurality of other electronic apparatuses may respectively include power source suppliers, and the electronic apparatus 100 may be an apparatus that supplies power to a power source supplier of each of the plurality of other electronic apparatuses.

If an apparatus has a possibility of internal circuit damage due to surge, the technical feature of the disclosure could be applied. The surge may be delivered along a wire or an electric circuit, and may be a transient waveform of an electrical current, voltage or power with the characteristics of a rapid increase and a gradual decrease over a short period of time. For example, when a sudden overvoltage occurs in a power line due to lightning, or the like, dielectric damage or failure of an electronic apparatus may occur in the electronic apparatus. The electronic apparatus 100 may limit the effect of such surge. The operation of the electronic apparatus 100 will be described in detail.

The main circuit unit 110 may be a circuit for controlling the electronic apparatus 100.

However, the disclosure is not limited thereto, but when the electronic apparatus 100 is a unit that supplies power to an entire electronic apparatus, the main circuit unit 110 may be an auxiliary circuit for power supply. For example, the main circuit unit 110 may be a circuit that performs power factor compensation on the power supplied from the power source supplier 120. In this case, the power source supplier 120 may include a configuration for generating power such as a voltage source or a current source.

The power source supplier 120 may generate power, and supply the generated power to the main circuit unit 110. The power source supplier 120 may clamp the generated power at a predetermined level and output the power.

For example, the power source supplier 120 may clamp the generated power to 750V, and output the power. The generated power may exceed 750V as a surge occurs, and the power source supplier 120 may apply a clamp function to the generated power in order to clamp the power output by the power source supplier 120 to 750V even if the generated power exceeds 750V, and supply the power, with the clamp function having been applied, to the main circuit unit 110. The power output by the power source supplier 120 includes the voltage output by the power source supplier.

However, when the size of the generated power rapidly changes as a surface occurs, a voltage level at which clamping is performed may vary. According to the above-described example, when the size of the generated power rapidly changes, the power source supplier 120 may clamp the power generated at a voltage higher than 750V, for example, 1200V. In this case, other circuits included in the main circuit unit 110 and the electronic apparatus 100 could be damaged. Such problem may be solved through the surge protection unit 130.

The surge protection unit 130 may be disposed between the main circuit unit 110 and the power source supplier 120. When a surge occurs at the power source supplier 120, the surge protection unit 130 may clamp power output from the power source supplier 120 at a voltage level lower than a voltage level at which the power source supplier 120 itself clamps the power. Hereinafter, for ease of explanation, a clamping voltage level of the surge protection unit 130 will be referred to as a first voltage level, and a clamping voltage level of the power source supplier 120 will be referred to as a second voltage level. In addition, the first voltage level may be lower than the second voltage level.

A clamping response speed of the surge protection unit 130 may be faster than a clamping response speed of the power source supplier 120. Accordingly, power affected by a surge may be clamped first at the first voltage level, and then clamped at the second voltage level.

As described above, even if a surge occurs and the power generated by the power source supplier 120 becomes greater than the first voltage level, the surge protection unit 130 of the electronic apparatus 100 may clamp the generated power at the first voltage level. When the surge protection unit 130 stops clamping at the first voltage level, the power source supplier 120 may clamp the generated power at the second voltage level and output the power.

However, the clamping operation of the power source supplier 120 may not have a cause-effect relationship with the clamping operation of the surge protection unit 130. That is, it may not be that the power source supplier 120 starts the clamping operation as the clamping operation of the surge protection unit 130 at the first level stops.

To be specific, the power source supplier 120 may clamp the generated power at the second voltage level. However, the clamping voltage level of the surge protection unit 130 may be lower than the clamping voltage level of the power source supplier 120, and thus the generated power may always be lower than the second voltage level while the surge protection unit 130 performs a clamping operation. Therefore, the power source supplier 120 merely cannot perform a clamping operation, but it is not that the clamping operation of the power source supplier 120 starts as the clamping operation at the first voltage level stops.

The electronic apparatus 100 may further include an overvoltage protection circuit unit (not shown). The overvoltage protection circuit unit may include a capacitor. When a voltage of the capacitor due to an output voltage of the main circuit unit 110 is greater than a predetermined first voltage, the overvoltage protection unit may stop a clamping operation of the surge protection unit 130. The overvoltage protection circuit unit may prevent the surge protection unit 130 from being damaged as surge occurs continuously.

As described above, the power source supplier 120 may be configured in the same manner as a conventional power source supplier to minimize the size of a leakage current, as well as performing a clamping operation at a lower voltage level by further comprising an additional surge protection unit 130.

Hereinafter, the configuration and operation of the electronic apparatus 100 will be described in detail through the drawings.

Figure 3:
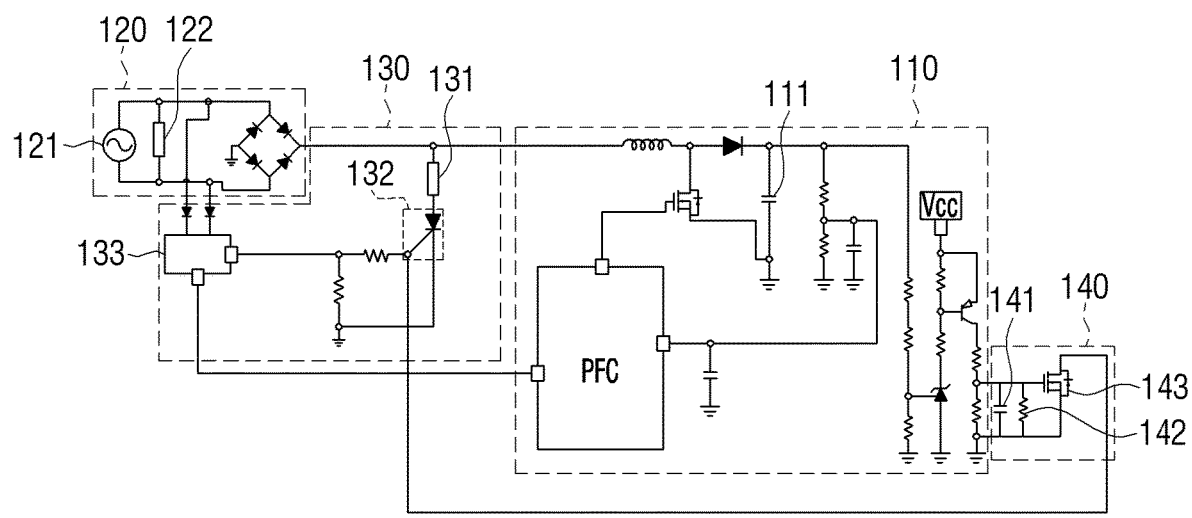
FIG. 3 is a view to explain a detailed circuit of an electronic apparatus according to an embodiment of the disclosure.

FIG. 3 is a view to explain a detailed circuit of the electronic apparatus 100 according to an embodiment of the disclosure.

An electronic apparatus 100 may include a main circuit 110, a power source supplier 120, a surge protection unit 130, and an overvoltage protection circuit unit 140.

A power factor compensation circuit has been illustrated as the main circuit unit 110, but an output capacitor 111 could be included. However, the disclosure is not limited thereto, but any type of circuit could be the main circuit unit 110 as long as it receives power.

The surge protection unit 130 may include a first varistor 131 of which one end is connected to an output terminal of the power source supplier 120, a Silicon Controlled Rectifier (SCR) 132 including an anode terminal connected to the other end of the first varistor and a grounded cathode terminal, and a surge sensor 133 of which output terminal is connected to a gate terminal of the SCR. As used herein, a grounded terminal includes a terminal connected to a circuit ground. The surge protection unit 130 may further include a resistor, a diode, etc. The surge sensor 133 may be implemented by a custom hardware circuit such as an application specific integrated circuit (ASIC), discrete components along with a processor with memory and software for execution of instructions on the processor to perform the functions of the surge sensor, or another combination of hardware and software.

The power source supplier 120 may include a power source 121 for generating power and a second varistor 122 connected to the power source 121 in parallel for clamping the generated power at a second voltage level. The power source supplier 120 may further include a diode, etc.

The overvoltage protection circuit unit 140 may include a capacitor including one end connected to an output terminal of the main circuit unit 110 and a grounded other end, a resistor 142 connected to the capacitor 141 in parallel, and a switching element 143 including a first terminal connected to an output terminal, a second terminal connected to a gate terminal of a SCR 132, and a grounded third terminal.

Hereinafter, the operation of each configuration will be described in sequence.

The power source 121 may generate power. In some embodiments, the power source 121 may include, for example, an interface to an AC Mains delivered by a power company to a wall outlet. The power source 121 may be connected by a cable and plug to the wall outlet. For example, see the cable and plug indications of FIG. 10 (connected to a switching mode power supply, SMPS). Electrical energy from the AC Mains may be rectified and filtered in the power source 121 to provide the output of the power source 121. The power generated by the power source 121 may be applied to a first varistor 131 through a bridge rectifier.

The first varistor 131 and the second varistor 122 may clamp power output from the power source 121. The first varistor 131 may clamp power at a first voltage level lower than the second varistor 122, and a clamping response speed may be higher.

In order for the first varistor 131 to clamp power, the surge sensor 133 may sense voltages of both ends of the power source supplier 120. In other words, the surge sensor 133 may sense voltages of both ends of the power source supplier 120, and when the sensed voltage is greater than a predetermined second voltage, may generate a control signal such that the first varistor 131 operates. The predetermined second voltage may be higher than a normal voltage level, and lower than a second voltage level, which is a clamping operation level of the second varistor 122.

The surge sensor 133 may sense voltages of both ends of the power source supplier 120 through two diodes respectively connected to both ends of the power source supplier 120. The two diodes respectively connected to both ends of the power source supplier 120 may prevent a current from being reversed and applied to the power source supplier 120.

When a surge occurs and the sensed voltage becomes greater than the predetermined second voltage, the surge sensor 133 may apply a signal to a gate terminal of the SCR 132, and turn on the SCR 132. A plurality of resistors for voltage distribution may be connected between the output terminal of the surge sensor 133 and the gate terminal of the SCR 132.

When the SCR 132 is turned on, the other end of the first varistor 131 may be grounded. The first varistor 131 may sense power of the power source supplier 120, and clamp power at the first voltage level. The surge protection unit 130 may maintain the output terminal of the power source supplier 120 to a first voltage level or lower by the first varistor 131 when the SCR 132 is turned on and the other end of the first varistor 131 is grounded. The surge protection unit 130 may also be referred to herein as a surge protector.

When the sensed voltage is smaller than the predetermined second voltage, the surge sensor 133 may stop generating of a signal applied to the gate terminal of the SCR 132 and render the SCR 132 to be off.

In this case, the other end of the first varistor 131 may be off. In other words, the surge protection unit 130 may stop a clamping operation by the first varistor 131.

The overvoltage protection circuit unit 140 may stop a clamping operation by the first varistor 131. A capacitor 141 of the overvoltage protection circuit unit 140 may be connected to the output terminal of the main circuit unit 110 and changed by an output voltage. When a surge occurs more than a predetermined number of times or the duration of the surge exceeds a predetermined time, the voltage of the capacitor 141 may become greater than a predetermined first voltage. When the voltage of the capacitor 141 becomes greater than the predetermined first voltage, second and third terminals of the switching element 143 may be turned on, and the gate terminal of the SCR 132 may be grounded. In other words, the surge protection unit 130 may stop a clamping operation by the first varistor 130 when the switching element 132 is turned on and the SCR 132 is turned off.

Although not shown in FIG. 3, the surge sensor 133 may sense a voltage level of a predetermined node in the main circuit unit 110, and apply a signal to the gate terminal of the SCR 132 based on the sensed voltage level. In this case, the surge protection unit 140 may maintain the output terminal of the power source supplier 120 to the first voltage level or lower when the SCR 132 is turned on and the other end of the first varistor 131 is grounded.

The power source supplier 120, when the clamping operation of the surge protection unit 130 at the first voltage level stops, may clamp the generated power at the second voltage level greater than the first voltage level. The power source supplier 120 may perform a clamping operation when the surge protection unit 130 stops the clamping operation at the first voltage level, and the generated power is greater than the first voltage level. The surge protection unit 130 stops the clamping operation at the first voltage level in various cases as described above.

By using the first varistor 131 having a voltage level for a clamping operation rather than the second varistor 122 provided in the power source supplier 120, a clamping operation could be performed at a low voltage level even if a surge occurs in the power source supplier 120. In addition, when the first varistor 131 is connected to the power source 121 in parallel, instead of the second varistor 122, a leakage current may be increased. However, according to the disclosure, a leakage current may not increase by using the second varistor 122.

The main circuit unit 110 may include an output capacitor 111, and the output capacitor 111 may be embodied with a film capacitor. When there is no surge protection unit 130, the output capacitor 111 of the main circuit unit 110 needs an electrolytic capacitor with relatively high durability to prevent damage due to surge. However, as the surge protection unit 130 prevents damage to the main circuit unit 110, the output capacitor 111 may be embodied with a film capacitor having a longer life time than an electrolytic capacitor.

FIG. 4 is a view to explain a varistor according to an embodiment of the disclosure.

Referring to FIG. 4, the type of varistor could vary. For example, INR14D391K 410 may perform a clamping operation at a voltage level of 390V, but perform a clamping operation at a voltage level of maximum 650V when a sudden surge occurs. In addition, INR14D751K 420 may perform a clamping operation at a voltage level of 750V, and perform a clamping operation at a voltage level of maximum 1240V when a sudden surge occurs.

When the INR14D751K 420 is used as the second varitor 122 without an additional surge protection unit 130, a voltage of maximum 1240V may be applied to the main circuit unit 110 due to a sudden surge, so that the main circuit unit 110 may be damaged.

When the surge protection unit 130 including the INR14D391K 410 as the first varistor 131 is connected to the main circuit unit 110, the INR14D391K 410 may clamp power at a voltage level of maximum 650V although a sudden surge occurs.

Although the INR14D391K 410 does perform a clamping operation any further due to the overvoltage protection circuit unit 140, the INR14D751K 420 may clamp power at a voltage level of 750V. This could be after the INR14D391K 410 performs a clamping operation, and time is delayed sufficiently. In other words, the surge protection unit 130 including the INR14D391K 410 as the first varistor 131 may be connected to the main circuit unit 110, so that the INR14D751K 420 may not perform a clamping operation in response to a sudden surge.

The main circuit unit 110 may be protected through such the above-described method.

Figure 5:
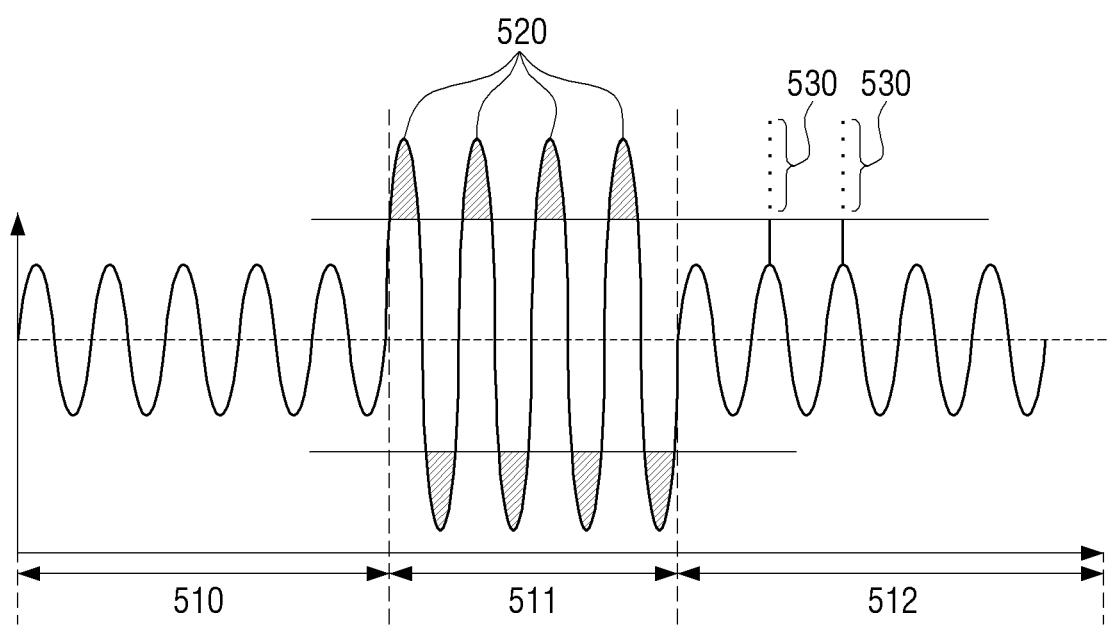
FIG. 5 is a view to explain a voltage level and an operation of each varistor according to an embodiment of the disclosure.

FIG. 5 is a view to explain a voltage level and an operation of each varistor according to an embodiment of the disclosure.

Referring to FIG. 5, a first interval 510 may be an example of a normal power supply waveform.

A second section 511 and a third section 512 may show a clamping operation at a first voltage level of a first varistor 131.

The second interval 511 represents a state in which the operation of the power source supplier 120 is unstable and the amplitude of the output power is increased. The operation of the power source supplier 120 may be unstable due to various reasons such as when the power supplied to the power source supplier 120 is unstable of when the power source supplier 120 is old.

A third interval 512 represents a state in which a surge occurs at a time point when an amplitude is the largest, and an impulse-type power is output instantaneously. However, the disclosure is not limited thereto, and the time point of surge occurrence may vary.

In the second interval 511 and the third interval 512, portions 520 and 530 where the waveform of power is higher than the first voltage level may be clamped and output at the first voltage level. As used herein, the waveform of power includes the voltage waveform within the power supplier 120 sensed by the surge sensor 133. In addition, the interval where the waveform is output at the first voltage level may be an interval where the first varistor 131 operates. In other words, heat may be generated in the waveform is output at the first voltage level as the first varistor operates.

In order to prevent the first varistor 131 being heated and damaged as heat is generated, the clamping operation of the first varistor 131 may be stopped at a specific time point. The overvoltage protection circuit unit 140, if the output voltage of the main circuit unit 110 satisfies a predetermined condition, may stop a clamping operation of the first varistor 131 by feeding back the output voltage of the main circuit unit 110.

However, the disclosure is not limited thereto. The overvoltage protection circuit unit 140 may sense power of the power source supplier 120, and if the sensed power satisfies a predetermined condition, may stop the clamping operation of the first varistor 131.

If output power is abnormal even after the clamping operation of the first varistor 131 at the first voltage level is stopped due to the overvoltage protection circuit unit 140, the second varistor 122 may operate. For example, after the clamping operation of the first varitor 131 at the first voltage level is stopped, and the voltage level of the power generated by the power source 121 increases, the second varistor 122 may clamp the generated power at the second voltage level.

The second varistor 122 may perform a clamping operation at a voltage level at which the second varistor 122 normally clamps due to the delay from the time when a surge occurs to the time when the clamping operation of the first varistor 131 is stopped. For example, the second varistor 122 may perform a clamping operation at a voltage level of 750V, but if a sudden surge occurs, even if a device performs a clamping operation at a voltage level of maximum 1240V, the second varistor 122 may perform a clamping operation at a voltage level of 750V due to the delay caused by the clamping operation of the first varistor 131.

Figure 6:
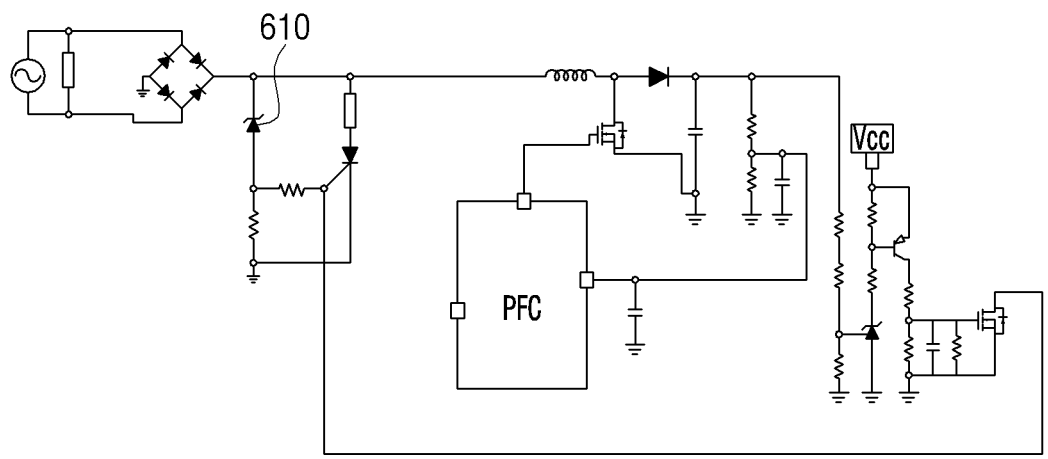
FIG. 6 is a view to explain a detailed circuit of an electronic apparatus according to another embodiment of the disclosure.

FIG. 6 is a view to explain detailed circuit of an electronic apparatus 100 according to another embodiment of the disclosure.

Referring to FIG. 6, a surge protection unit 130 may include a Zener diode 610 instead of the surge protection unit 133.

For example, if power output from the power source supplier 120 is equal to or greater than a predetermined voltage level, a reversed current may flow through the Zener diode 610. When the reversed current flows through a plurality of resistors for voltage distribution, a voltage may be applied to the gate terminal of the SCR 132, and thus the SCR 132 may be turned on. Accordingly, the first varistor 131 may perform a clamping operation.

Figure 7:
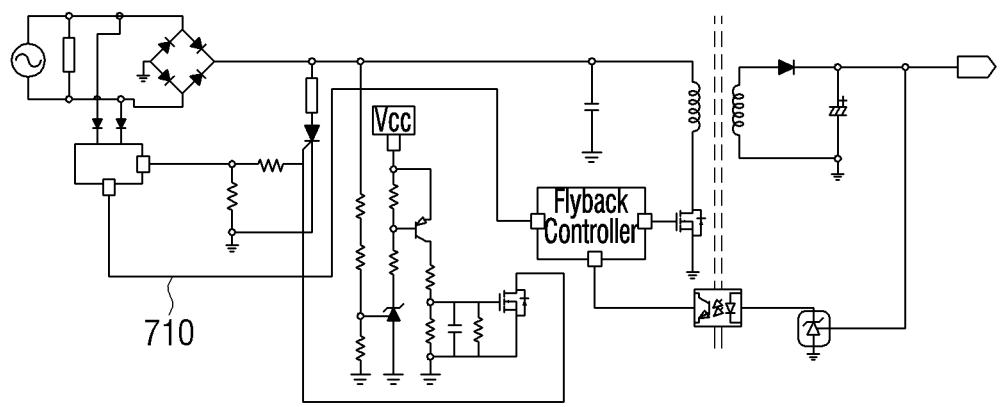
FIG. 7 is a view to explain a surge sensing method according to another embodiment of the disclosure.

FIG. 7 is a view to explain a surge sensing method according to another embodiment of the disclosure.

Referring to FIG. 7, a surge sensor 133 may sense a voltage level of a predetermined node 710 in the main circuit unit 110, and apply a signal to a gate terminal of the SCR 132 based on the sensed voltage level. In this case, the surge protection unit 130 may maintain the output terminal of the power source supplier 120 to the first voltage level or lower by the first varistor 131 when the SCR 132 is turned on, and then the other end of the first varistor 131 is grounded.

The surge sensor 133 may control the first varistor 131 to operate by sensing at least one of voltages of both ends of the power source supplier 120 or a voltage level of the predetermined node 710 in the main circuit unit 110.

The surge sensor 133 may stop a clamping operation by the first varistor 131 when voltages of both ends of the power source supplier 120 are smaller than a predetermined second voltage, and the voltage level of the predetermined node 710 in the main circuit unit 110 is lower than a predetermined threshold voltage level, a clamping operation due to the first varistor 131 may be stopped.

Figure 8A:
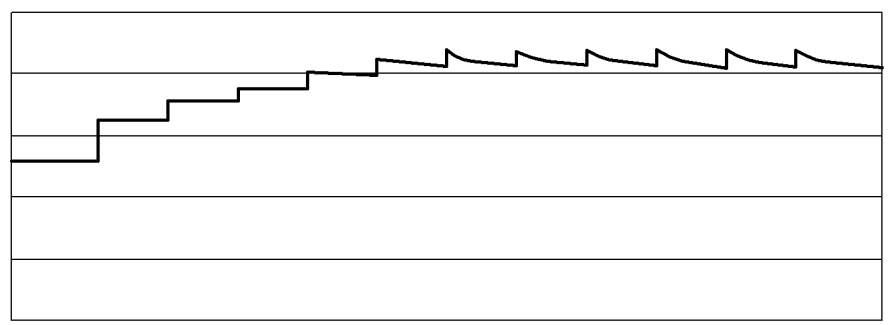
FIG. 8A is a view to explain a clamping result according to an embodiment of the disclosure.
Figure 8B:
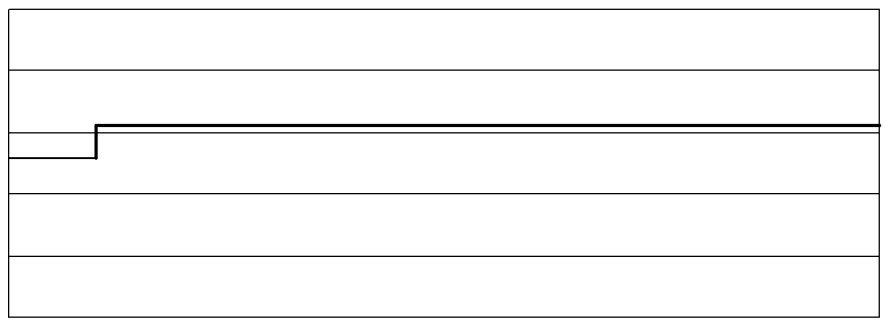
FIG. 8B is a view to explain a clamping result according to an embodiment of the disclosure.

FIGS. 8A and 8B are views to explain a clamping result according to an embodiment of the disclosure.

FIG. 8A shows a result of surge occurrence when a source protection unit 130 is not provided, and FIG. 8B shows a result of surge occurrence when the surge protection unit 130 is provided.

Referring to FIG. 8A, there may be no surge protection unit 130, a clamping operation may be performed only with a varistor in the power source supplier 120, and a clamping voltage level of a varistor may be high. Therefore, when a sudden surge occurs, a clamped voltage level may be very high.

However, referring to FIG. 8B, when the surge protection unit 130 is provided, power may be saturated at a voltage level lower than the case where the surge protection unit 130 is not provided as in FIG. 8A. Accordingly, a life time of the main circuit unit 110 may be extended by protecting the main circuit unit 110, minimizing a leakage current to the power source 121, and embodying the output capacitor 111 with a film capacitor.

FIG. 9A, FIG. 9B, FIG. 9C, FIG. 9D, FIG. 9E and FIG. 9F are views to explain application examples according to various embodiments of the disclosure.

Figure 9A:
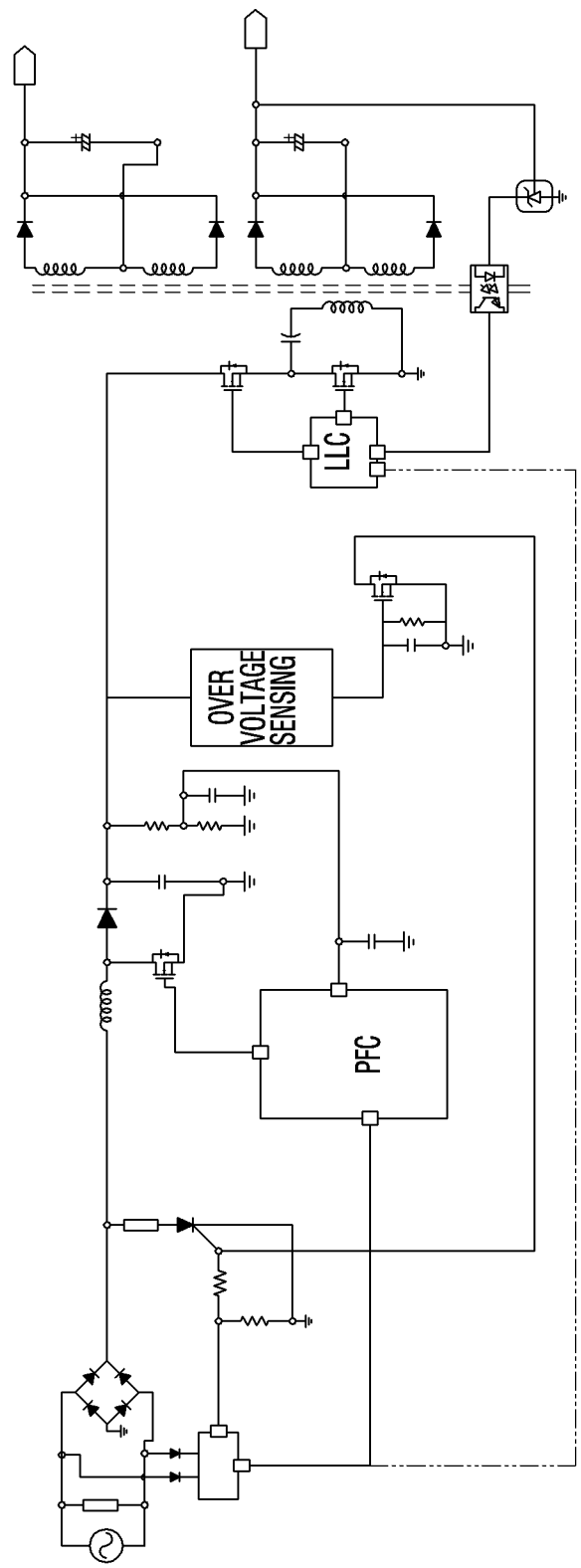
FIG. 9A is a view to explain application examples according to various embodiments of the disclosure.
Figure 9B:
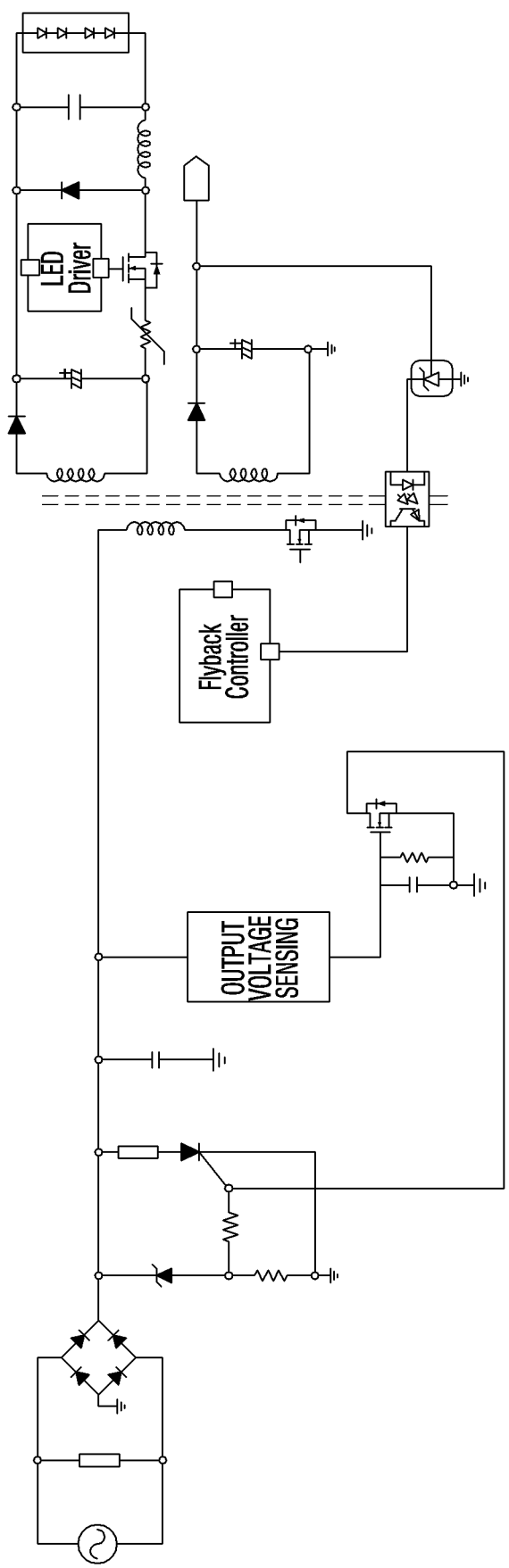
FIG. 9B is a view to explain application examples according to various embodiments of the disclosure.
Figure 9C:
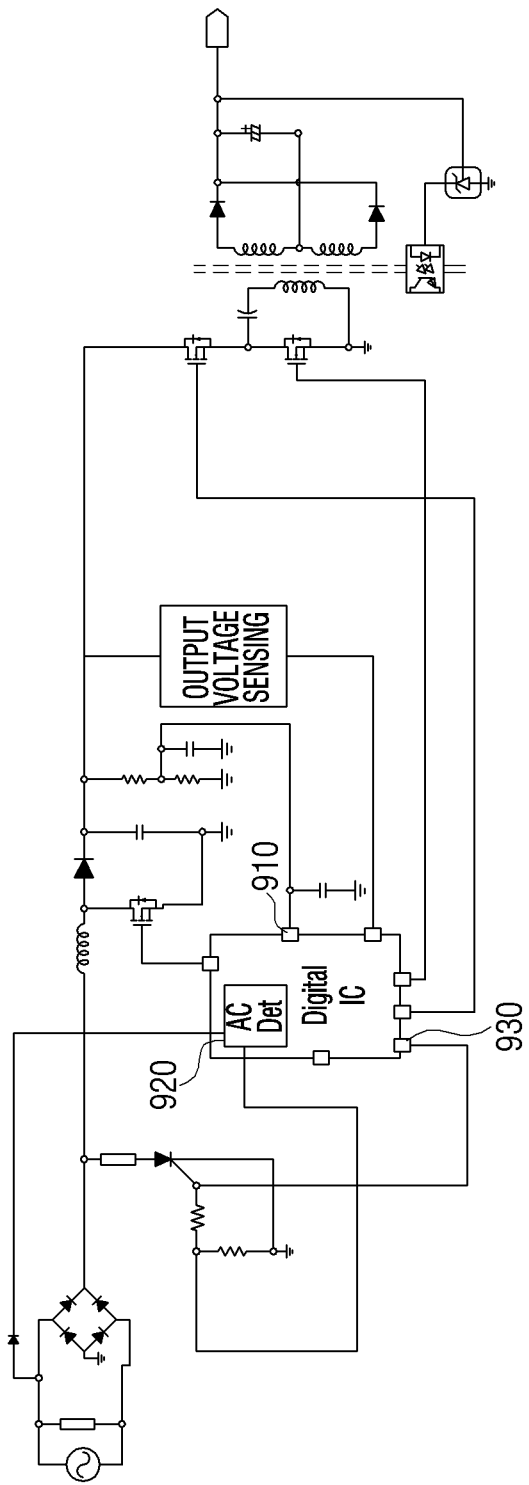
FIG. 9C is a view to explain application examples according to various embodiments of the disclosure.
Figure 9D:
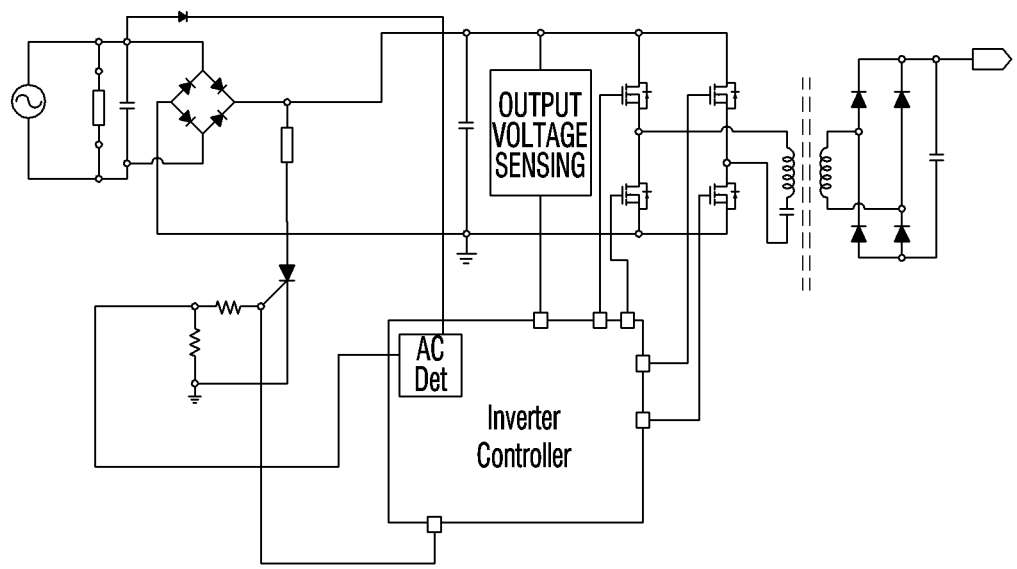
FIG. 9D is a view to explain application examples according to various embodiments of the disclosure.
Figure 9E:
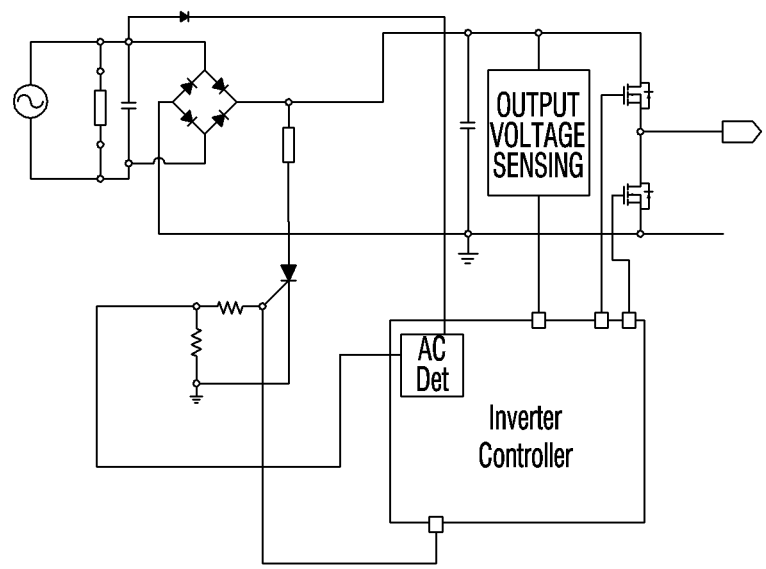
FIG. 9E is a view to explain application examples according to various embodiments of the disclosure.

FIG. 9A is a view illustrating a surge protection unit 130 in a PFC circuit of a display apparatus, FIG. 9B is a view illustrating a surge protection unit 130 in a flyback circuit, FIG. 9C is a view illustrating a surge protection unit 130 in a digital IC, FIG. 9D is a view illustrating a surge protection unit 130 in a full bridge inverter circuit, and FIG. 9E is a view illustrating a surge protection unit 130 in a half bridge inverter circuit.

Referring to FIG. 9C, when using Digital IC, Micom, etc., it is possible to prevent damage to the first varistor 131 by using various methods.

For example, referring to FIG. 9C, the Digital IC may sense the output voltage of the main circuit unit 110 through the first input terminal 910. If the time when a surge is identified to occur in the output voltage exceeds a predetermined time, the digital IC may change the output of an output terminal 930 from high to low and prevent damage to the first varistor 131.

Referring to FIG. 9C, the Digital IC may sense the power supplied from the power source supplier 120 through a second input terminal 920. If the time when a surge is identified to occur in the sensed power exceeds a predetermined time, the digital IC may change the output of the output terminal 930 from high to low and prevent the damage to the first varistor 131.

In other words, when using Digital IC, Micom, etc. The Digital IC may identify whether a surge occurs based on power supplied from the power source supplier 120 compared to the case where only a passive element is used, and perform an operation to prevent the damage to the first varistor 131.

Other than the example embodiments shown in FIG. 9A, FIG. 9B, FIG. 9C, FIG. 9D, and FIG. 9E, if the power source supplier 120 is provided and a surge occurs in an electronic apparatus 100, the electronic apparatus 100 may be protected from a surge by adding the surge protection unit 130 as shown in the disclosure.

Figure 10:
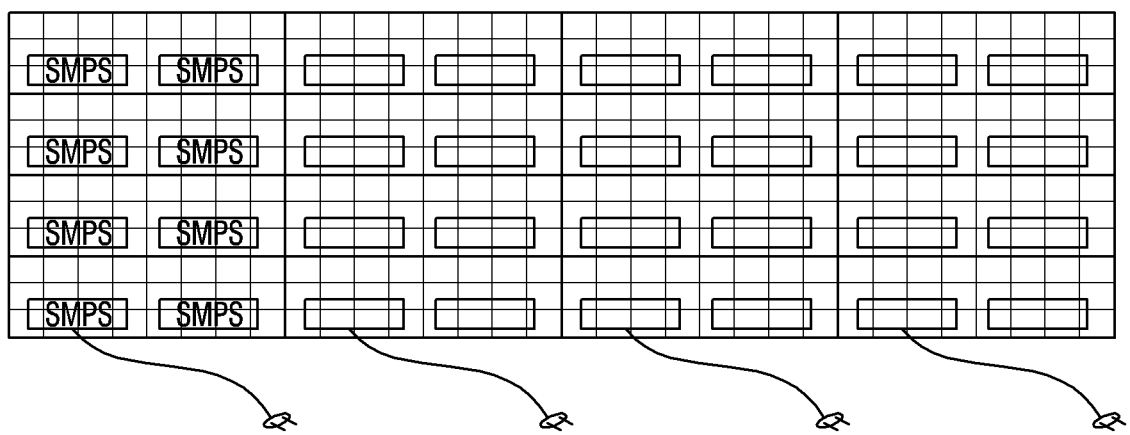
FIG. 10 is a view to explain an application example according to another embodiment of the disclosure.

FIG. 10 is a view to explain an application example according to another embodiment of the disclosure.

It is described that a single circuit includes a single surge protection unit, but the disclosure is not limited thereto.

For example, referring to FIG. 10, in the case of a display requiring a plurality of power sources, even if only one power source is damaged by an external surge, the remainder may be critically affected.

Therefore, a surge protection unit may be provided for each power source supplier, or a surge protection unit may be provided for each AC cord input unit to protect an electronic apparatus.

FIG. 11 is a flowchart to explain a controlling method for an electronic apparatus according to an embodiment of the disclosure.

A controlling method for an electronic apparatus comprising a main circuit unit, a power source supplier, and a surge protector disposed between the main circuit and the power source supplier may comprise generating power through a power source supplier, and supplying the generated power to the main circuit unit at step S1110. When a surge occurs at the power source supplier, power output from the power source supplier may be clamped by a surge protection unit at a first voltage level at step S1120. When the clamping operation of the surge protection unit at the first voltage level stops, the generated power may be clamped by the power source supplier at a second voltage level greater than the first voltage level to be output at step S1130.

The electronic apparatus may further include an overvoltage protection circuit unit including a capacitor, and the controlling method may further include stopping a clamping operation of the surge protection unit by the overvoltage protection circuit unit when a voltage of a capacitor due to an output voltage of the main circuit unit is greater than a predetermined first voltage.

The surge protection unit may include a first varistor of which one end is connected to an output terminal of a power source supplier, a Silicon Controlled Rectifier (SCR) including an anode terminal connected to the other end of the first varistor, and a grounded cathode terminal, and a surge protector including an input terminal connected to both ends of the power source supplier, and an output terminal connected to a gate terminal of the SCR. The clamping at step S1120 may include maintaining the output terminal of the power source supplier to the first voltage level or lower by the first varistor.

The clamping at step S1120 may include sensing voltages of both ends of the power source supplier by a surge sensor, when a sensed voltage is greater than a predetermined second voltage due to surge occurrence, applying a signal to the gate terminal of the SCR by the surge sensor and turning on the SCR, and when the SCR is turned on and the other end of the first varistor is grounded, maintaining the output terminal of the power source supplier to the first voltage level or lower by the first varistor.

The stopping may include, when the sensed voltage is smaller than a predetermined second voltage, stopping generating a signal applied to the gate terminal of the SCR by the sensor, turning off the SCR, and stopping a clamping operation by the first varistor.

The overvoltage protection circuit unit may include a capacitor including one end connected to the output terminal of the main circuit unit and the grounded terminal, a resistor connected to the capacitor in parallel, a switching element including a first terminal connected to the output terminal, a second terminal connected to the gate terminal of the SCR, and a grounded third terminal. The stopping may include, when a voltage of a capacitor is greater than a predetermined first voltage, turning on the second terminal and the third terminal, and when the switching element is turned on and the SCR is turned off, stopping a clamping operation by the first varistor.

The power source supplier may include a power source for generating power and a second varistor connected to the power source in parallel, and the outputting at step S1130 may include clamping power generated by the second varistor at a second voltage level.

The clamping at step S1120 may include sensing a voltage level of a predetermined node in a main circuit unit by a surge sensor, and applying a signal to the gate terminal of the SCR based on the sensed voltage level.

The main circuit unit may include an output capacitor connected to an output terminal, and the output capacitor may be a film capacitor.

As described above, according to various embodiments of the disclosure, an electronic apparatus may further include an auxiliary varistor having a small capacity than a main varistor connected to a power source, and the auxiliary varistor may quickly respond than the main varistor when a sudden overvoltage occurs, and protect a circuit from a time when an overvoltage occurs to a time when a main varistor operates.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although exemplary embodiments have been shown and described, it will be appreciated by those skilled in the art that changes may be made to these exemplary embodiments without departing from the principles and spirit of the disclosure. Accordingly, the scope of the invention is not construed as being limited to the described exemplary embodiments, but is defined by the appended claims as well as equivalents thereto.

What is claimed is:

1. An electronic apparatus, comprising:
   a main circuit unit;
   a power source supplier configured to generate power, and supply the generated power to the main circuit unit;
   a surge protector disposed between the main circuit unit and the power source supplier, the surge protector being configured to, based on a surge occurring within the power source supplier, perform a first clamping operation on a power output from the power source supplier at a first voltage level or lower,
   an overvoltage protection circuit unit coupled to the main circuit unit, wherein the overvoltage protection circuit unit comprises a capacitor, and wherein the overvoltage protection circuit unit is configured to, based on an output voltage level of the main circuit unit charging the capacitor to a value equal to or greater than a third voltage level, stop the first clamping operation, and
   wherein the power source supplier is further configured to, based on the first clamping operation being stopped, perform a second clamping operation within the power source supplier at a second voltage level greater than the first voltage level.

2. The electronic apparatus as claimed in claim 1, wherein the surge protector comprises:
   a first varistor of which a first end is connected to an output terminal of the power source supplier;
   a Silicon Controlled Rectifier (SCR) including:
   an anode terminal connected to a second end of the first varistor, and
   a cathode terminal connected to a circuit ground; and
   a surge sensor including:
   an input terminal connected to the power source supplier, and
   an output terminal connected to a gate terminal of the SCR.

3. The electronic apparatus as claimed in claim 2, wherein the surge sensor is configured to:
   sense a fourth voltage level of the power source supplier, and
   based on the fourth voltage level being, due to the occurrence of the surge, equal to or greater than a fifth voltage level, turn on the SCR by applying a signal to the gate terminal of the SCR, and
   wherein the surge protector is further configured to, based on the SCR being turned on and a second end of the first varistor being connected to the circuit ground, maintain the output terminal of the power source supplier at the first voltage level or lower by the first varistor.

4. The electronic apparatus as claimed in claim 3, wherein the surge sensor is further configured to, based on the fourth voltage level being less than the fifth voltage level, stop applying the signal to the gate terminal of the SCR, thereby turning off the SCR and stopping the first clamping operation.

5. The electronic apparatus as claimed in claim 3, wherein a first end of the capacitor is connected to an output terminal of the main circuit unit and a second end of the capacitor is connected to a circuit ground, and wherein the overvoltage protection circuit unit further comprises:
   a resistor connected to the capacitor in parallel; and
   a switching element, wherein a first terminal of the switching element is connected to the output terminal and to the first end of the capacitor, and wherein a second terminal of the switching element is connected to the gate terminal of the SCR, and wherein a third terminal of the switching element is connected to the circuit ground.

6. The electronic apparatus as claimed in claim 5, wherein the switching element is configured to turn on when the second terminal of the switching element, based on a voltage level of the capacitor being greater than or equal to the third voltage level, and
   wherein the surge protector is further configured to, based on the switching element being turned on and the SCR is turned off, stop the first clamping operation.

7. The electronic apparatus as claimed in claim 2, wherein the power source supplier comprises:
   a power source; and
   a second varistor connected to the power source in parallel, wherein the second varistor is configured to perform a second clamping operation on an output of the power source at the second voltage level.

8. The electronic apparatus as claimed in claim 2, wherein the surge sensor is further configured to:
   sense a voltage level of a predetermined node in the main circuit unit, and
   apply a signal to the gate terminal of the SCR based on the sensed voltage level.

9. The electronic apparatus as claimed in claim 1, wherein the main circuit unit comprises an output capacitor connected to an output terminal, and wherein the output capacitor is a film capacitor.

10. A method for controlling an electronic apparatus, wherein the electronic apparatus comprises a main circuit unit, a power source supplier, a surge protector disposed between the main circuit unit and the power source supplier, and an overvoltage protection circuit unit comprising a capacitor, the method comprising:
    generating, by the power source supplier, power and supplying the generated power to the main circuit unit;
    performing, by the surge protector and based on a surge occurring from the power source supplier, a first clamping operation on a power output of the power source supplier at a first voltage level or lower;
    based on an output voltage level of the main circuit unit charging the capacitor to a value greater than equal to a third voltage level, stopping the first clamping operation; and
    based on the first clamping operation being stopped, performing a second clamping operation by the power source supplier within the power source supplier at a second voltage level greater than the first voltage level.

11. The method as claimed in claim 10, wherein the surge protector comprises a first varistor of which a first end is connected to an output terminal of the power source supplier, a Silicon Controlled Rectifier (SCR) including an anode terminal connected to the a second end of the first varistor and a cathode terminal connected to a circuit ground, and a surge sensor including an input terminal connected to the power source supplier and an output terminal connected to a gate terminal of the SCR, and wherein the performing the first clamping operation comprises maintaining the output terminal of the power source supplier at the first voltage level or lower by the first varistor.

12. The method as claimed in claim 11, wherein the performing of the clamping operation comprises:

sensing a fourth voltage of the power source supplier by the surge sensor;

based on the fourth voltage level being, due to the occurrence of the surge, equal to or greater than a fifth voltage level, turning on the SCR by applying a signal to the gate terminal of the SCR; and based on the SCR being turned on and a second end of the first varistor being connected to the circuit ground, maintaining the output terminal of the power source supplier at the first voltage level or lower by the first varistor.

13. The method as claimed in claim 12, wherein the stopping the first clamping operation comprises:

based on the fourth voltage level being smaller than the fifth voltage level, stopping a generation of the signal applied to the gate terminal of the SCR, thereby turning off the SCR and stopping the first clamping operation.

14. The method as claimed in claim 12, wherein a first end of the capacitor is connected to an output terminal of the main circuit unit and a second end of the capacitor is connected to a circuit ground, and the overvoltage protection circuit unit further comprises a resistor connected to the capacitor in parallel, and a switching element wherein a first terminal of the switching element is connected to the output terminal and to the first end of the capacitor, and wherein a second terminal of the switching element is connected to the gate terminal of the SCR, and wherein a third terminal of the switching element is connected to the circuit ground, wherein the stopping comprises:

based on a voltage level of the capacitor being greater than or equal to the third voltage level, turning on the switching element; and based on the switching element being turned on and the SCR is turned off, stopping the first clamping operation.

15. The method as claimed in claim 11, wherein the power source supplier comprises a power source, and a second varistor connected to the power source in parallel, the method further comprising performing a second clamping operation on an output of the power source at the second voltage level by the second varistor.

16. The method as claimed in claim 11, wherein the performing of the second clamping operation comprises:

sensing a voltage level of a predetermined node in the main circuit unit by the surge sensor; and applying a signal to the gate terminal of the SCR based on the sensed voltage level.

17. The method as claimed in claim 10, wherein the main circuit unit comprises an output capacitor connected to an output terminal, and wherein the output capacitor is a film capacitor.

18. A surge protection apparatus comprising:

a varistor coupled to a first input and an output of the surge protection circuit, wherein the first input is configured to be coupled to a power supplier unit and the first output is configured to be coupled to a main circuit unit;

a silicon controlled rectifier (SCR) coupled to the varistor, wherein the SCR is configured to be coupled to an overvoltage protection circuit, and wherein the SCR forms a circuit path between the varistor and a circuit ground; and a surge sensor configured to be coupled to the power source supplier via at least a second input, wherein the surge sensor is configured to:

perform a clamping action, using the varistor and the SCR, to clamp the first input to a first voltage based on a measured voltage of the power source supplier exceeding a second voltage, and wherein the SCR is configured to, based on a third voltage of the overvoltage protection circuit exceeding a fourth voltage, stop the clamping action by interrupting the circuit path between the varistor and the circuit ground.

* * * * *